UNITED STATES PATENT OFFICE.

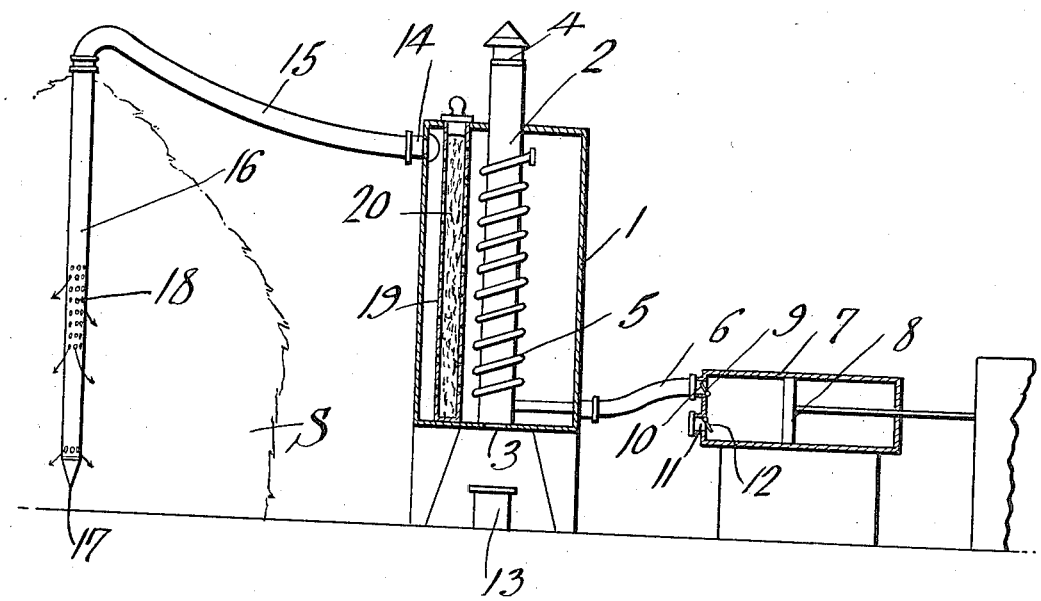

DAVID R. OLMSTED, OF COUNCIL BLUFFS, IOWA.

GRAIN-DRYING APPARATUS.

1,236,473.  Specification of Letters Patent.  Patented Aug. 14, 1917.

Application filed July 17, 1916. Serial No. 109,727.

*To all whom it may concern:*

Be it known that I, DAVID R. OLMSTED, a citizen of the United States, residing at Council Bluffs, in the county of Pottawattamie and State of Iowa, have invented a new and useful Grain-Drying Apparatus, of which the following is a specification.

This invention relates to apparatus for drying grain, hay and the like while in stacks, holds of ships, warehouses, etc., where the same has become wet from any cause and is likely to pack, become moldy or become otherwise injured as a result, and which would produce a considerable depreciation in the value of the product.

One of the objects of the invention is to provide apparatus which can be utilized for forcing heated air into the product to drive the moisture therefrom.

A further object is to provide apparatus of this character which can be easily manipulated and which can be applied to stacks in a field as readily as to the contents of warehouses, etc.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing, which is a view partly in elevation and partly in section of the apparatus, the same being shown in diagram, the preferred form of the invention has been shown.

Referring to the figures by characters of reference 1 designates a heating drum through which extends an imperforate flue 2 having an inlet opening 3 at its lower end and an outlet 4 at its upper end. A coil 5 extends about the flue and opens at one end into the drum 1 while its other end is connected by a pipe 6 or in any other suitable manner, to the cylinder 7 of a pump, the piston 8 within said cylinder being actuated in any suitable manner. The outlet 9 of the cylinder has a check valve 10 and said cylinder is also provided with an inlet 11 having a check valve 12. A suitable heater 13 is arranged under the drum 1 and the hot products of combustion are designed to flow upwardly through the flue 2 so as to heat the air contained within the drum 1 and also to heat the coil 5. Drum 1 has an outlet 14 from which extends a pipe 15 connected to one end of a distributing tube 16. This tube has its free end pointed as at 17 and a portion of the tube is formed with a plurality of perforations as shown at 18.

Arranged within the drum 1 is a perforated tube 19 extending through the top of the drum and adapted to be removed through said top. This tube constitutes a container for any suitable substance having an affinity for moisture. In practice it has been found that charcoal, salt or the like may be used. This filling material has been shown at 20.

In using this apparatus for the purpose of drying a stack of grain or the like, the distributing tube 16 is inserted into the stack S as shown in Figure 1, and the pump is then set in motion so as to force air into the coil 5 and thence into the drum 1. As heat is generated by the heater 13, the air within the drum will be heated by the walls of the flue 2 and said air will be preheated as it flows through the coil 5. The heated air will be directed through the pipe 15 into the tube 16 and be distributed into the central portion of the stack. This heated air will obviously drive the moisture outwardly from the stack and soon dry said stack. Any moisture which may be contained within the air in drum 1 will be absorbed by the material contained within the tube 19.

Apparatus such as has been described will be found particularly useful in drying stacks of grain, hay or the like and in removing moisture from, and thoroughly aerating wheat or other grain stored in the holds of ships, in warehouses, etc.

What is claimed is:—

1. Apparatus of the class described including a pointed perforated tube insertible into a body to be treated, a drum, a heating flue extending through the drum, a coil extending around the flue and discharging into the drum, means for forcing air into the coil, a tubular connection between the drum and the perforated tube, and a moisture absorbing material within a drum.

2. Apparatus of the class described including a pointed perforated tube insertible into a body to be treated, a drum, a heating flue extending through the drum, a coil extending around the flue and discharging into the drum, means for forcing air into the coil, a tubular connection between the drum and the perforated tube, a removable foraminous container within the drum and a moisture absorbing material within the container.

3. Apparatus of the class described including a pump having an air inlet port and an outlet port, a pointed perforated tube insertible into a body to be treated, a drum, a heater, a flue for conducting products of combustion from the heater and through the drum, a coil extending around the flue and discharging into the drum, a connection between said coil and one of the ports of the pump, a connection between the drum and the tube.

4. Apparatus of the class described including a pump having an air inlet port and an outlet port, a pointed perforated tube insertible into a body to be treated, a drum, a heater, a flue for conducting products of combustion from the heater and through the drum, a coil extending around the flue and discharging into the drum, a connection between said coil and one of the ports of the pump, a connection between the drum and the tube, a removable perforated container within the drum, and a moisture absorbing material within the container.

In testimony that I claim the foregoing as my own, I have hereto affixed my signature in the presence of two witnesses.

DAVID R. OLMSTED.

Witnesses:
T. E. HUFF,
J. W. BELL.

Copies of this patent may be obtained for five cents each, by addressing the "Commissioner of Patents, Washington, D. C."